Oct. 27, 1964 C. J. VAN DALEN 3,154,638
TELEGRAPH SYSTEM WITH PROTECTION AGAINST ERRORS AND CORRECTION OF SAME
Filed June 7, 1961 19 Sheets-Sheet 1

INVENTOR:
CHRISTIAAN J. VAN DALEN.
BY
Hugh A. Kirk
ATT'Y.

INVENTOR:
CHRISTIAAN J. VAN DALEN.
BY
Hugh A. Kirk
ATT'Y.

Oct. 27, 1964

C. J. VAN DALEN 3,154,638

TELEGRAPH SYSTEM WITH PROTECTION AGAINST ERRORS AND CORRECTION OF SAME

Filed June 7, 1961

19 Sheets-Sheet 3

INVENTOR:
CHRISTIAAN J. VAN DALEN.
BY
Hugh A. Kirk
ATT'Y.

INVENTOR:
CHRISTIAAN J. VAN DALEN.
BY
Hugh A Kirk
ATT'Y.

Oct. 27, 1964

C. J. VAN DALEN

TELEGRAPH SYSTEM WITH PROTECTION AGAINST ERRORS AND CORRECTION OF SAME 3,154,638

Filed June 7, 1961

19 Sheets-Sheet 5

INVENTOR:
CHRISTIAAN J. VAN DALEN.
BY
Hugh A Kirk
ATT'Y.

Oct. 27, 1964 C. J. VAN DALEN 3,154,638

TELEGRAPH SYSTEM WITH PROTECTION AGAINST ERRORS AND CORRECTION OF SAME

Filed June 7, 1961 19 Sheets-Sheet 6

INVENTOR:
CHRISTIAAN J. VAN DALEN.
BY Hugh A Kirk
ATT'Y.

Oct. 27, 1964

C. J. VAN DALEN 3,154,638

TELEGRAPH SYSTEM WITH PROTECTION AGAINST ERRORS AND CORRECTION OF SAME

Filed June 7, 1961

19 Sheets-Sheet 7

INVENTOR:
CHRISTIAAN J. VAN DALEN.
BY
Hugh A Kirk
ATT'Y.

Oct. 27, 1964 C. J. VAN DALEN 3,154,638

TELEGRAPH SYSTEM WITH PROTECTION AGAINST ERRORS AND CORRECTION OF SAME

Filed June 7, 1961 19 Sheets-Sheet 8

INVENTOR:
CHRISTIAAN J. VAN DALEN.
BY
Hugh A. Kirk
ATT'Y.

INVENTOR:
CHRISTIAAN J. VAN DALEN.
BY
Hugh A. Kirk
ATT'Y.

Oct. 27, 1964

C. J. VAN DALEN 3,154,638

TELEGRAPH SYSTEM WITH PROTECTION AGAINST ERRORS AND CORRECTION OF SAME

Filed June 7, 1961

19 Sheets-Sheet 10

INVENTOR:

CHRISTIAAN J. VAN DALEN.

BY

Hugh A. Kirk

ATT'Y.

Oct. 27, 1964 C. J. VAN DALEN 3,154,638
TELEGRAPH SYSTEM WITH PROTECTION AGAINST ERRORS AND CORRECTION OF SAME
Filed June 7, 1961 19 Sheets-Sheet 11
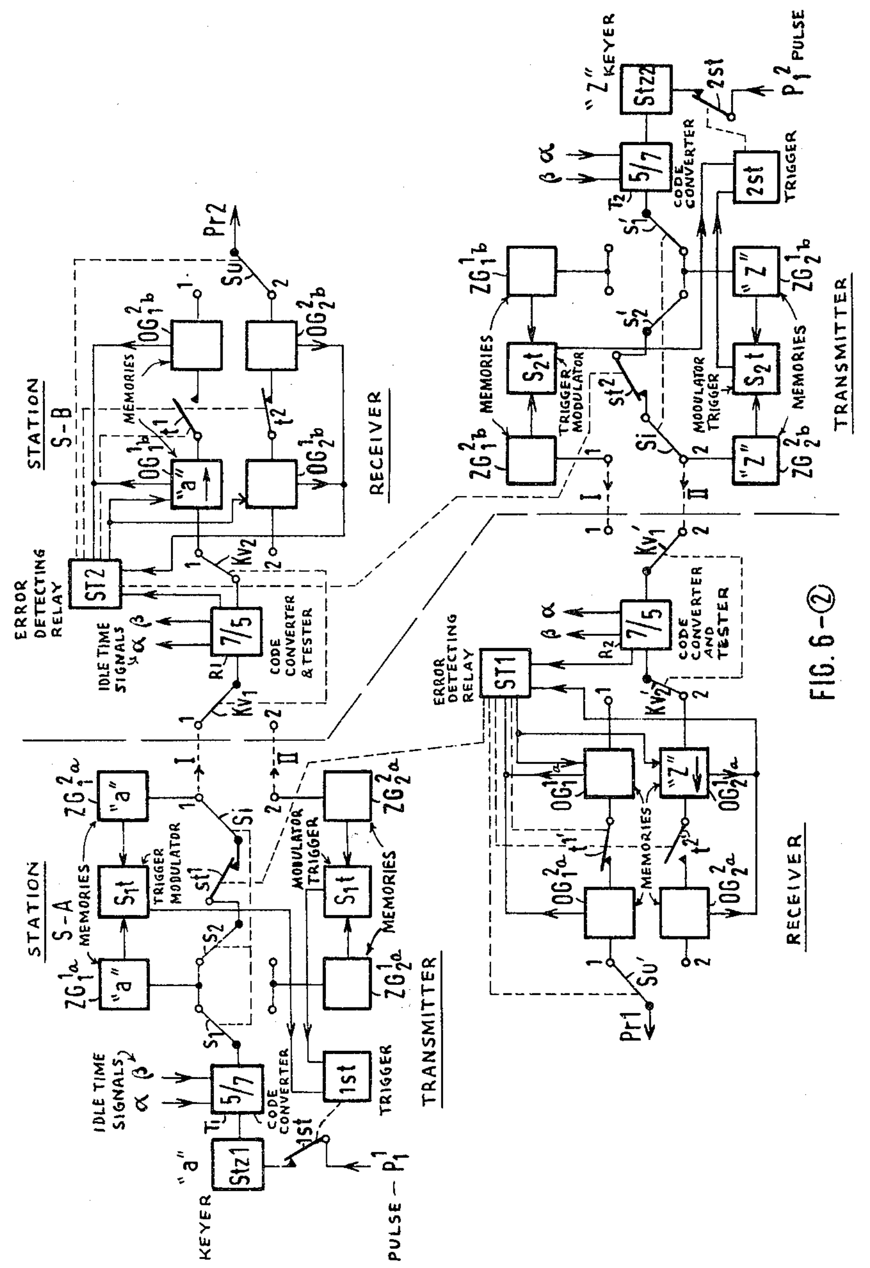
FIG. 6-②
INVENTOR:
CHRISTIAAN J. VAN DALEN
BY Hugh A. Kirk
ATT'Y.

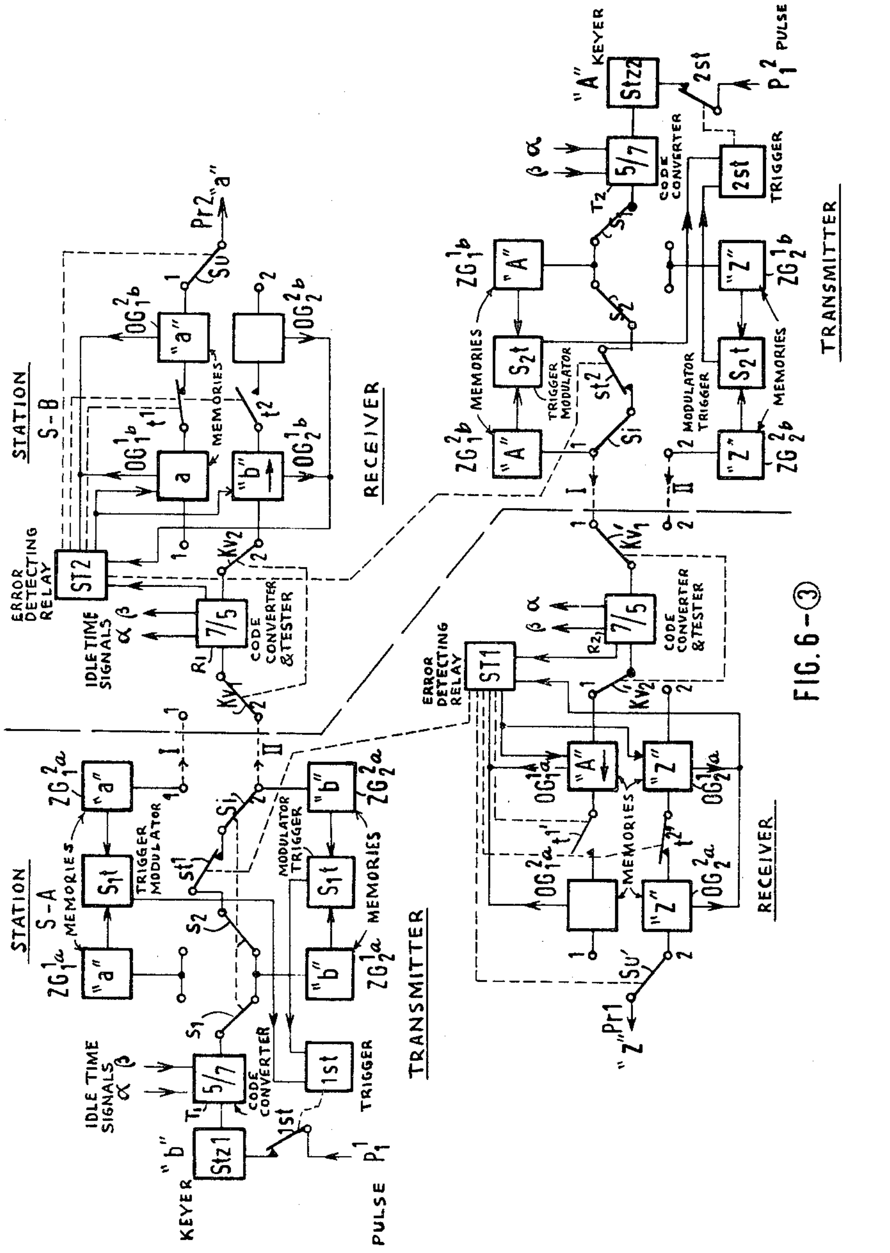
FIG. 6-③
INVENTOR:
CHRISTIAAN J. VAN DALEN
BY Hugh A. Kirk
ATT'Y.

Oct. 27, 1964 C. J. VAN DALEN 3,154,638
TELEGRAPH SYSTEM WITH PROTECTION AGAINST ERRORS AND CORRECTION OF SAME
Filed June 7, 1961 19 Sheets-Sheet 13
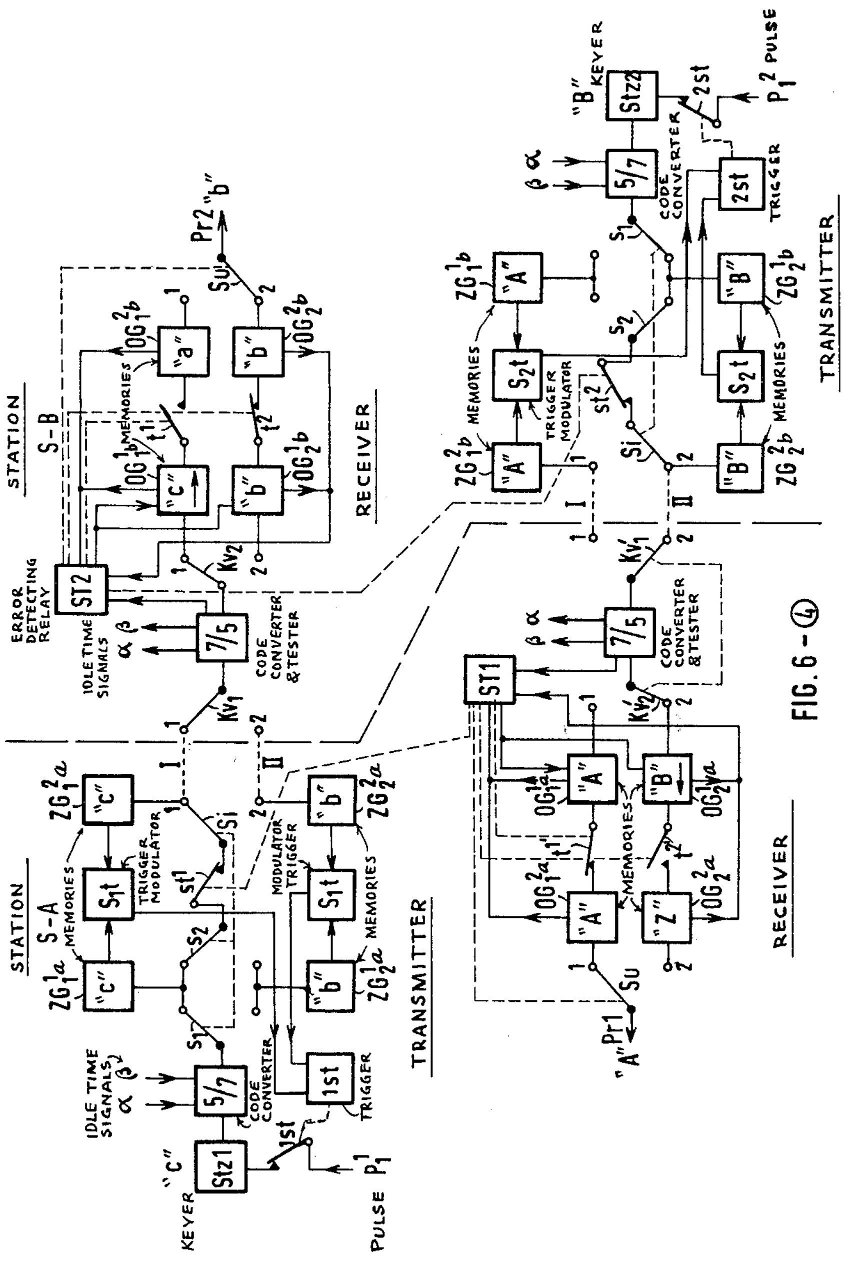
FIG. 6-④
INVENTOR:
CHRISTIAAN J. VAN DALEN.
BY Hugh A. Kirk
ATT'Y.

Oct. 27, 1964 C. J. VAN DALEN 3,154,638

TELEGRAPH SYSTEM WITH PROTECTION AGAINST ERRORS AND CORRECTION OF SAME

Filed June 7, 1961 19 Sheets-Sheet 14

INVENTOR:
CHRISTIAAN J. VAN DALEN.
BY
Hugh A. Kirk
ATT'Y.

Oct. 27, 1964 C. J. VAN DALEN 3,154,638

TELEGRAPH SYSTEM WITH PROTECTION AGAINST ERRORS AND CORRECTION OF SAME

Filed June 7, 1961 19 Sheets-Sheet 15

INVENTOR:
CHRISTIAAN J. VAN DALEN.
BY
Hugh A Kirk
ATT'Y.

INVENTOR:
CHRISTIAAN J. VAN DALEN.
BY
Hugh A. Kirk
ATT'Y.

Oct. 27, 1964 C. J. VAN DALEN 3,154,638
TELEGRAPH SYSTEM WITH PROTECTION AGAINST ERRORS AND CORRECTION OF SAME
Filed June 7, 1961 19 Sheets-Sheet 17
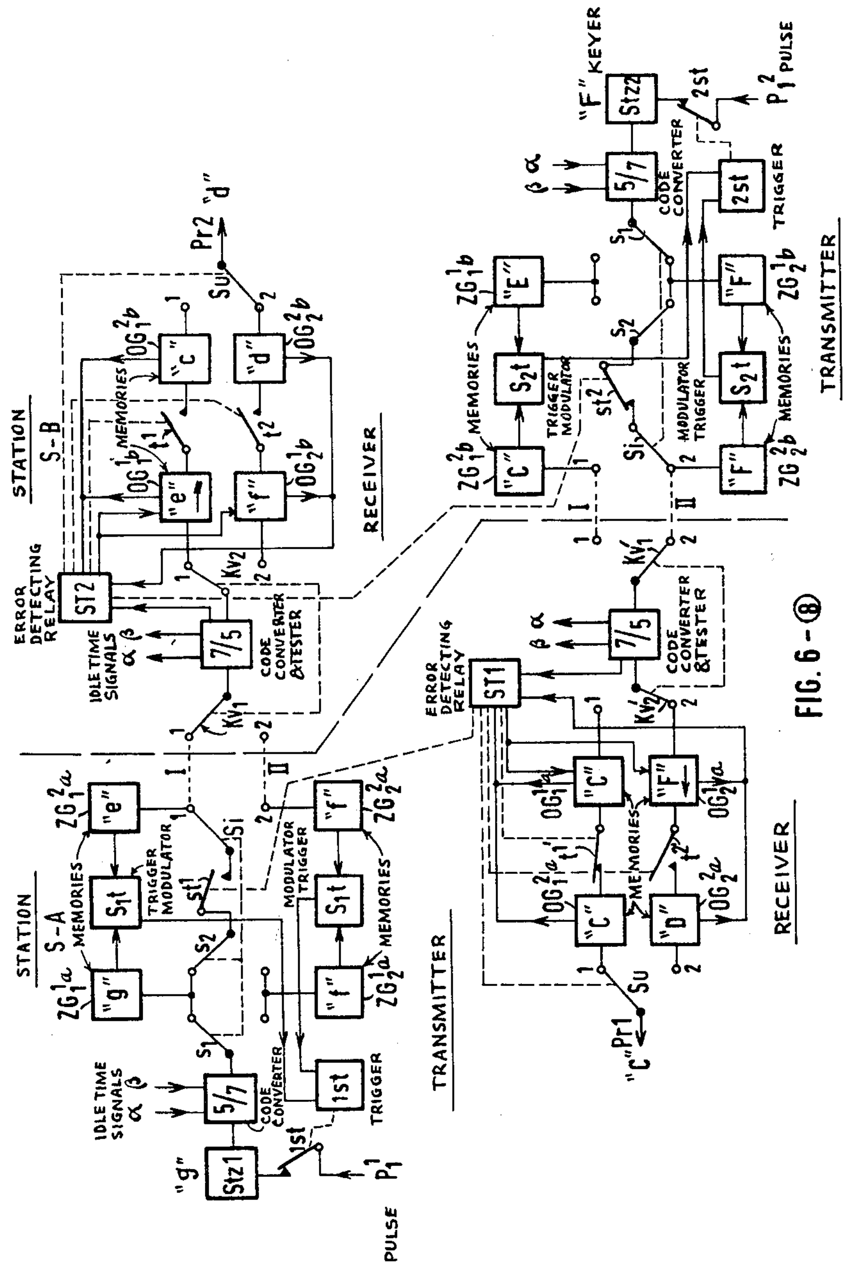
FIG. 6-⑧
INVENTOR:
CHRISTIAAN J. VAN DALEN
BY
Hugh A. Kirk
ATT'Y Oct. 27, 1964 C. J. VAN DALEN 3,154,638

TELEGRAPH SYSTEM WITH PROTECTION AGAINST ERRORS AND CORRECTION OF SAME

Filed June 7, 1961 19 Sheets-Sheet 18

INVENTOR:
CHRISTIAAN J. VAN DALEN
BY Hugh A. Kirk
ATT'Y.

INVENTOR:
CHRISTIAAN J. VAN DALEN.
BY
Hugh A. Kirk
ATT'Y.

3,154,638

TELEGRAPH SYSTEM WITH PROTECTION AGAINST ERRORS AND CORRECTION OF SAME

Christiaan Johannes van Dalen, Leidschendam, Netherlands, assignor to De Staat der Nederlanden, ten deze vertegenwoordigd door de Directeur-Generaal der Posterijen, Telegrafie en Telefonie, The Hague, Netherlands Filed June 7, 1961, Ser. No. 115,380
Claims priority, application Netherlands, June 9, 1960, 252,436
19 Claims. (Cl. 178—23)

Figure 1A:
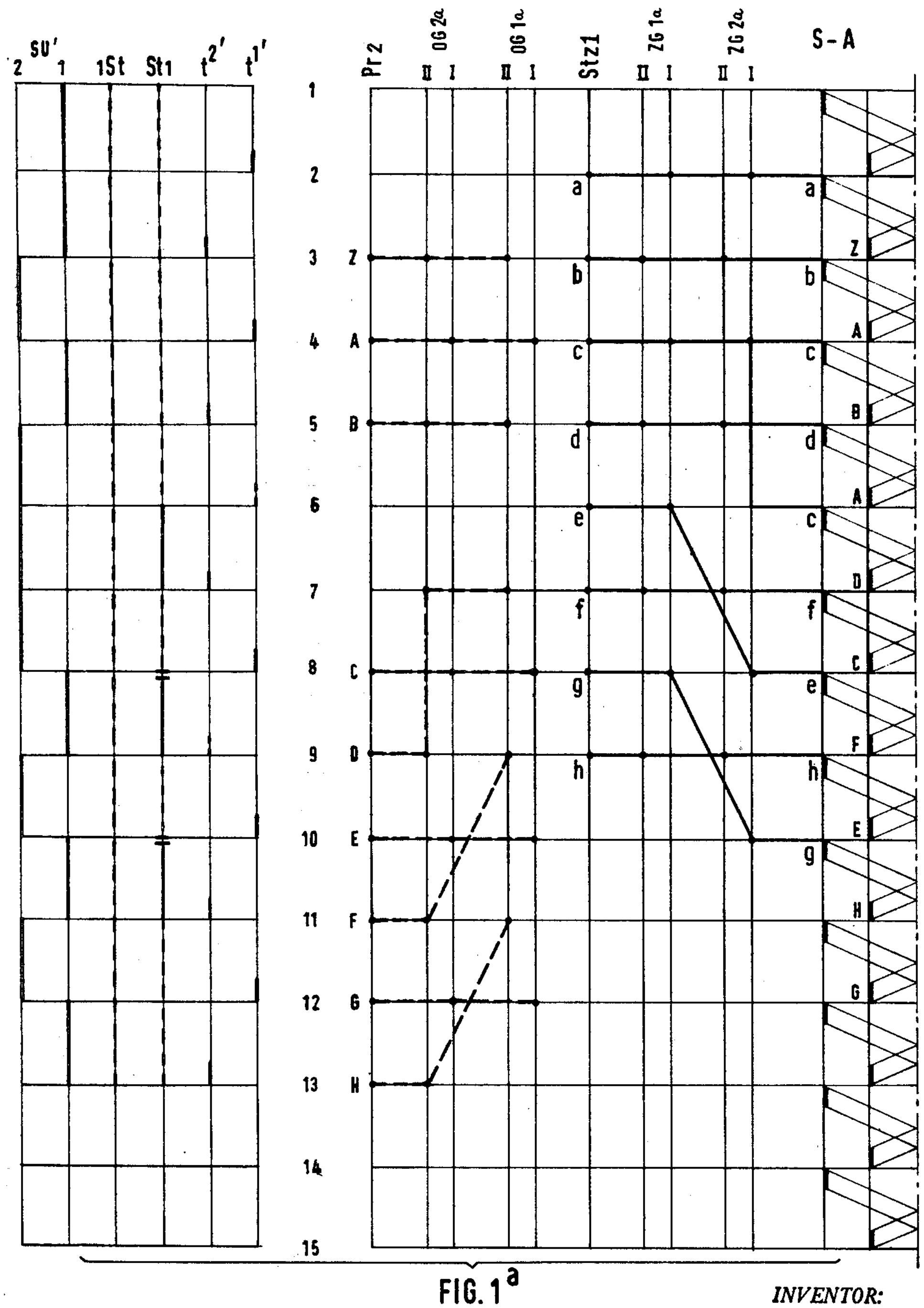

The invention relates to a type printing telegraph system for traffic in two directions, provided with means for correcting mutilated signals by repetition.

In existing printing telegraph systems, especially radio systems, a so-called repetition cycle is initiated on arrival of a mutilated signal, during which repetition cycle the printer is blocked. Usually the duration of this repetition cycle is equal to the duration of four signals. Immediately on detection of a mutilated signal a request for repetition is sent to the distant station. However, before this request for repetition has reached the distant station, this distant station has transmitted some more signals, which may have arrived correctly, but are not printed as the printer is blocked. Furthermore one of the four signals in the repetition cycle (as seen by the receiving end) is a special signal, such as "I," but it does not belong to the text to be transmitted. It was the object of the invention described in the copending Van Dalen U.S. Patent No. 3,001,018 issued Sept. 19, 1961 to avoid both the loss of correctly received signals, and to recover the place lost by transmission of a special signal.

Both of these objects were achieved in said copending patent by providing two channels for alternate signals for traffic in each of the two directions, whereby the signals correctly received between the incorrect reception of a signal and the correct reception obtained by repetition of this signal, are stored in a memory provided with switching means capable of supplying these stored signals as well as the signals obtained by repetition, in the right sequence to the printer. Thus the repetition of a signal received mutilated in one channel is requested by the repeated transmission of the last signal transmitted via that channel. However, the difference between the procedure, after the reception of a mutilated (disturbed) signal and after the reception of a request for repetition was that the signal received after the reception of the disturbed signal was directed to and temporarily stored in a memory, and the signal received after the reception of a request for repetition was directed to the printer immediately. This latter gives rise to the following problem: If a request for repetition is received incorrectly (although it does not happen very often that after a faulty reception of a traffic signal at one end of the connection, the request for repetition at the other end also will be received faulty, still it can happen) then the signal received thereafter will be directed to the memory when it should have been directed to the printer, and so the correct sequence of the printing is disturbed.

The object of the present invention is to avoid this loss of correct printing sequence in such a case, and accordingly this invention relates to an improvement on the system described in the U.S. patent application Serial No. 733,925, now U.S. Patent No. 3,001,018 issued September 19, 1961.

It has appeared that in the two directions of transmission together an increased average amount of traffic can be handled in the case of a quite symmetrical construction of the installations.

Thus the influence of repetitions on the intensity of traffic is only given by the number of the channel in which they occur, and no longer by their occurrence in go or return path.

This invention accordingly provides an improvement of the two-way system according to the above mentioned copending patent in which correction of mutilated signals is obtained by repetition, and which is characterized in that the signals correctly received between the incorrect reception of a signal and the correct reception of this signal obtained by repetition are stored in a memory provided with switching means capable of supplying these stored signals, as well as the signals obtained by repetition, to the printer in the right sequence. The improvement consists in that the go and return paths in these separate channels are combined into a single homogeneously working multi-channel system.

The invention particularly relates to a system of this kind, in which use is made of at least two separate channels for the transmission of messages coming from one subscriber. To achieve this, both stations are provided with a double transmitting memory and a double receiving memory. Accordingly the transmission of alternate traffic signals are tied to a definite channel, such as for example, the odd signals are transmitted in channel I and the even signals are transmitted in channel II, that is, if the folowing traffic signals must be transmitted: "A," "B," "C," "D" . . . and so on, then the letter "A" is transmitted via channel I, the letter "B" is transmitted via channel II, the letter "C" is transmitted via channel I, the letter "D" is transmitted via channel II, and so on. This channel-tied transmission is retained also after faulty reception. If, after faulty reception, there is a request for repetition, for example, with a signal from channel I, and the next to be transmitted signal belongs to channel I, then the next following signal belonging to channel II is transmitted first and the signal belonging to channel I is temporarily stored in a memory in the transmitter so that the transmitter is thus (according to this invention) equipped with an extra memory.

Figure 1B:
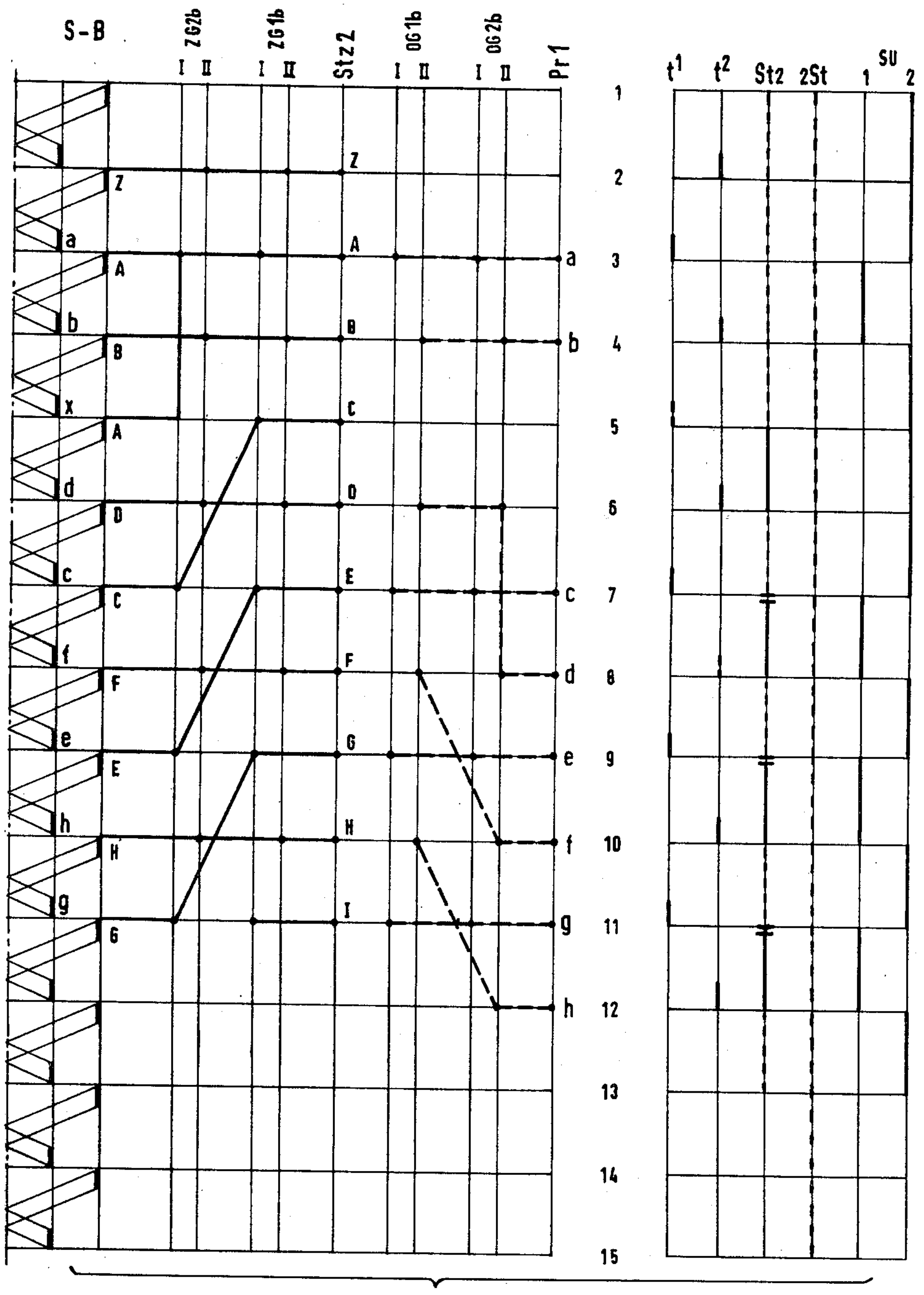
Figure 2A:
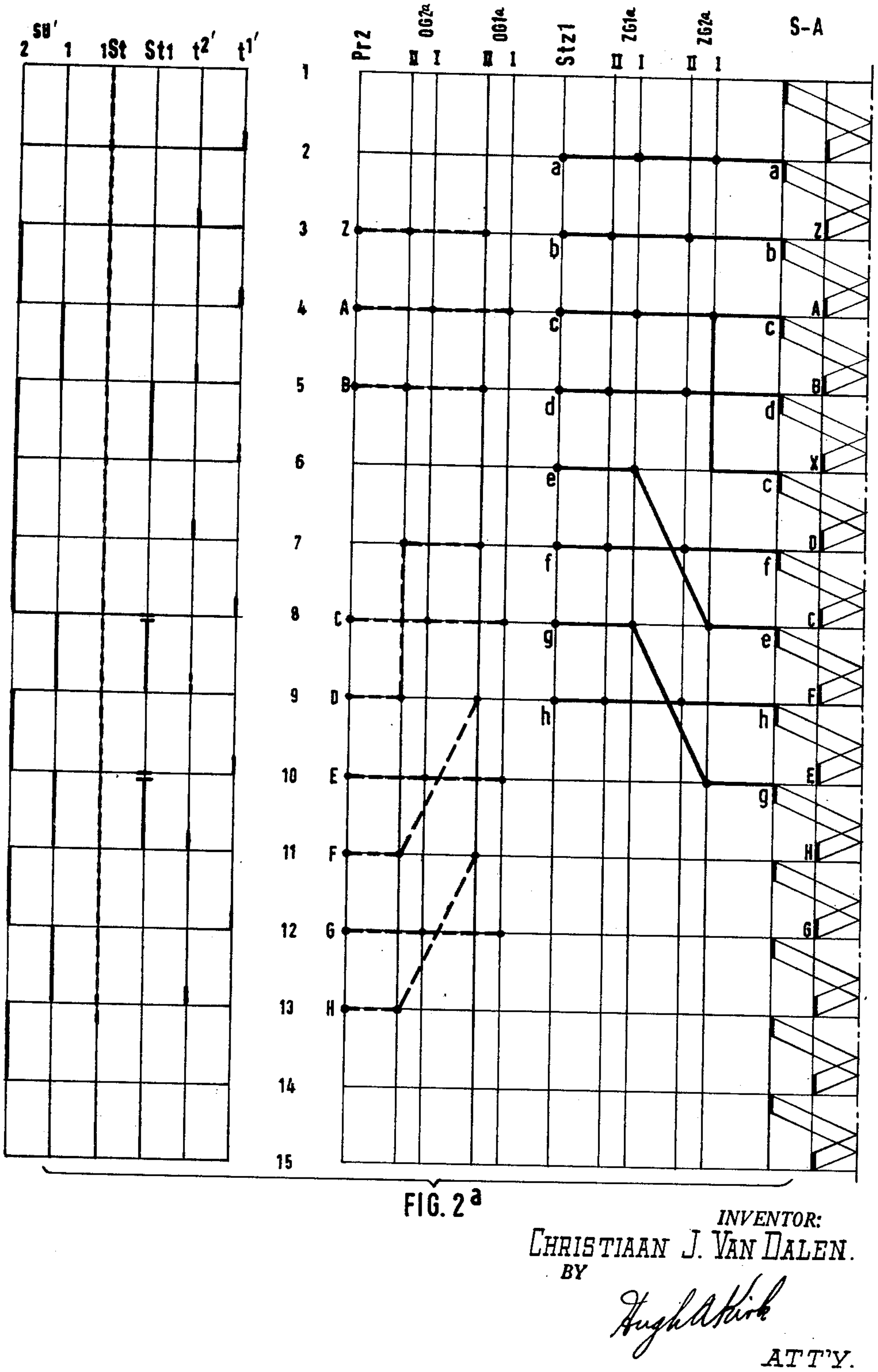
Figure 2B:
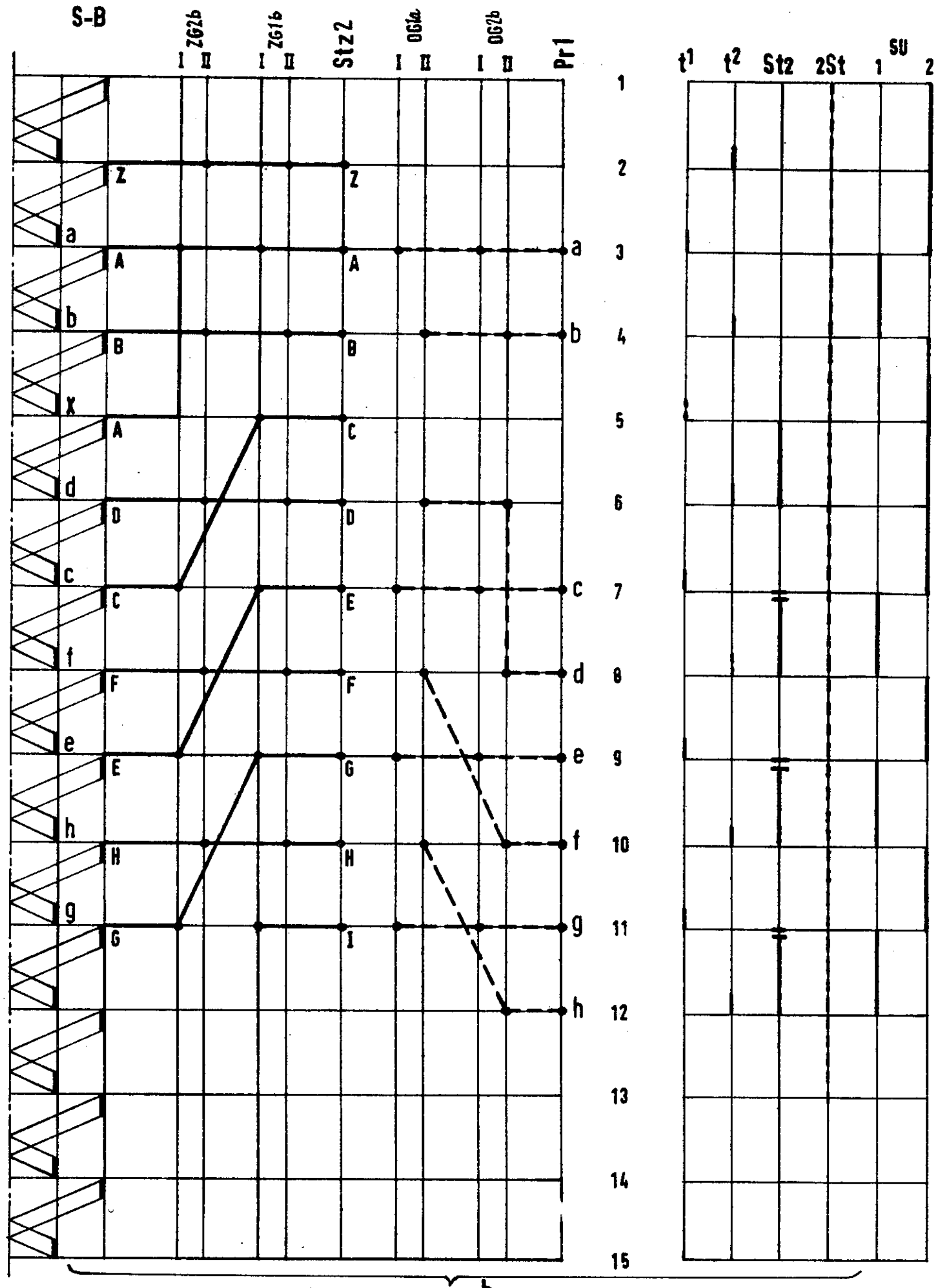
Figure 3A:
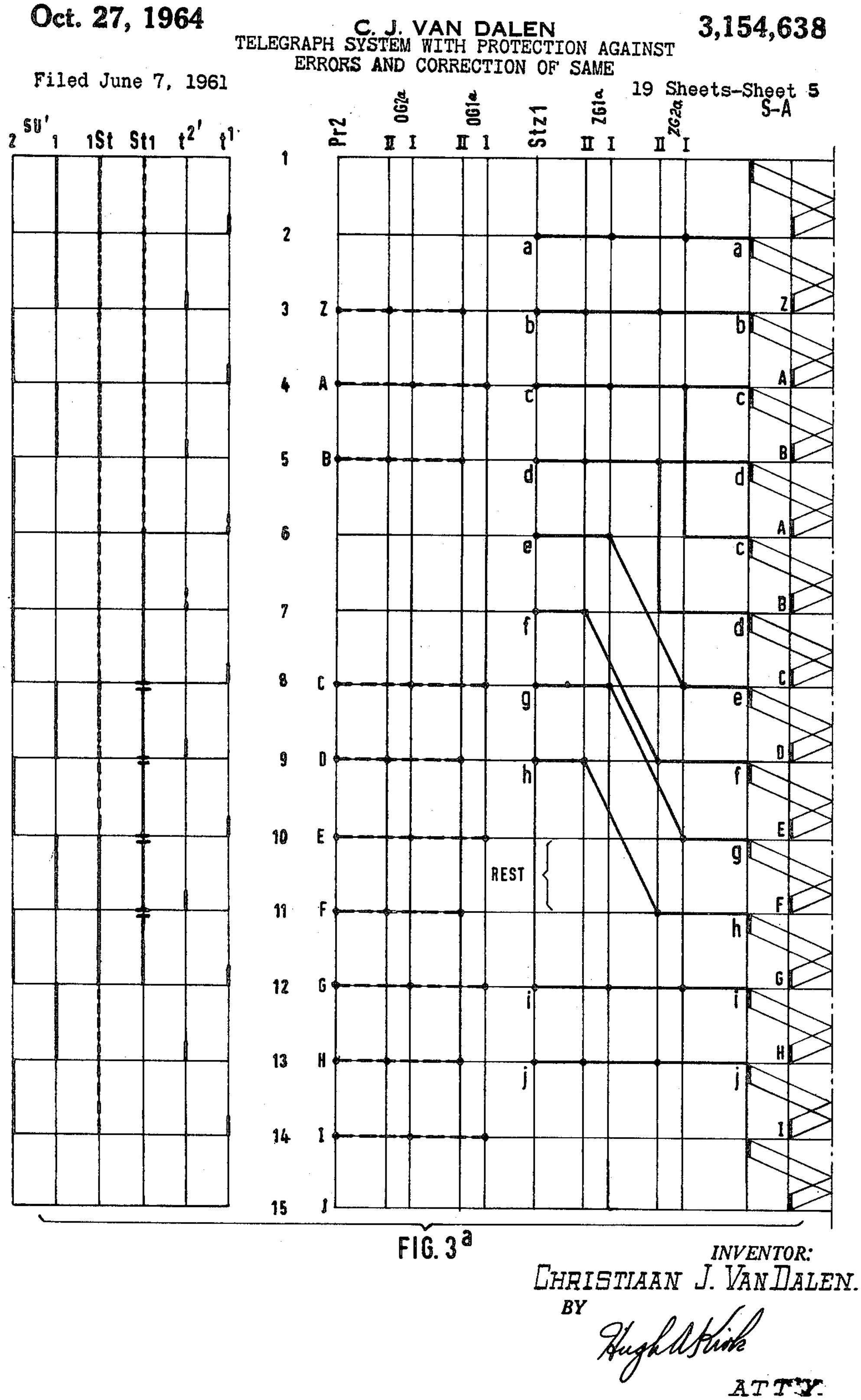
Figure 3B:
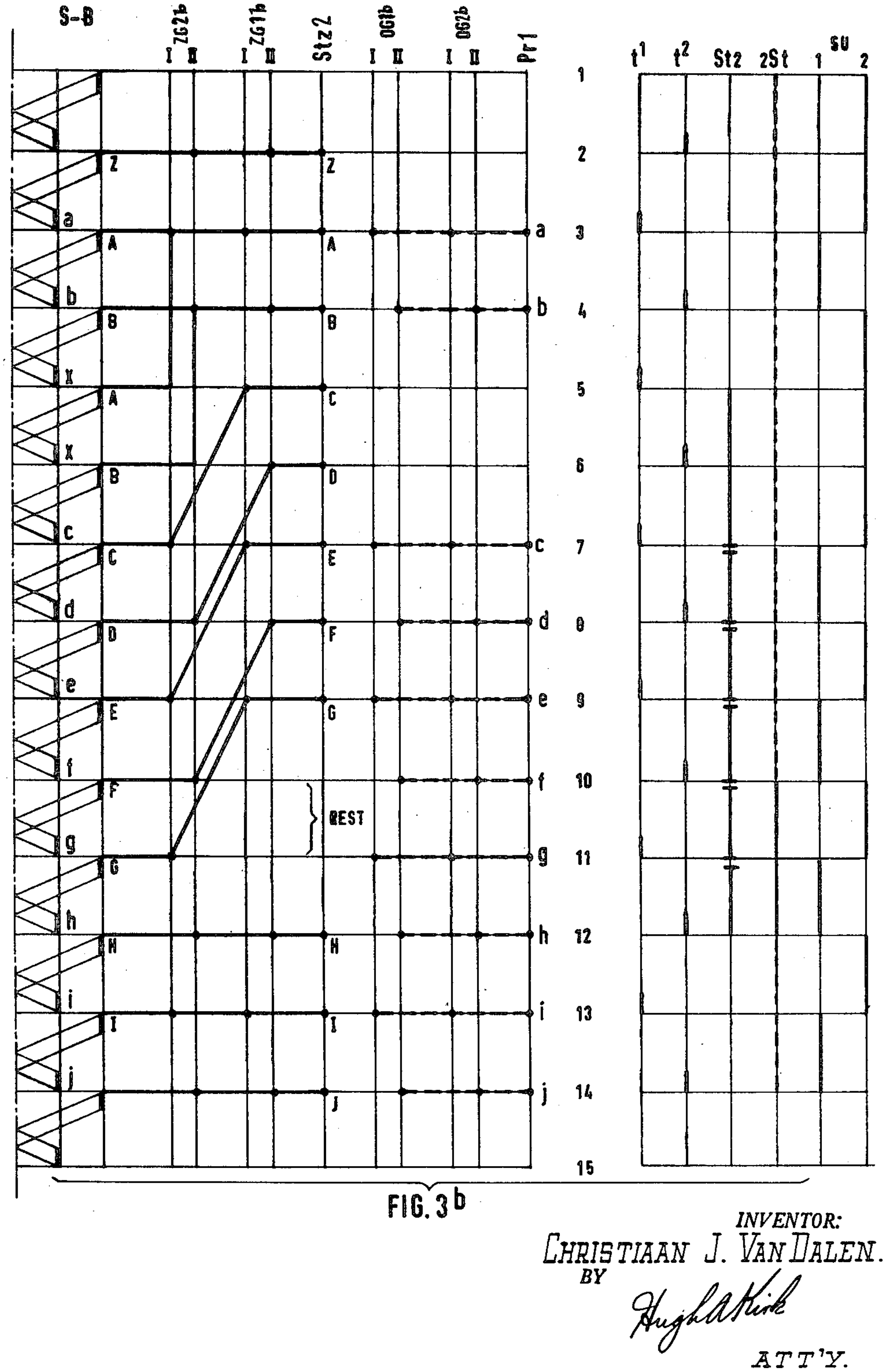
Figure 4A:
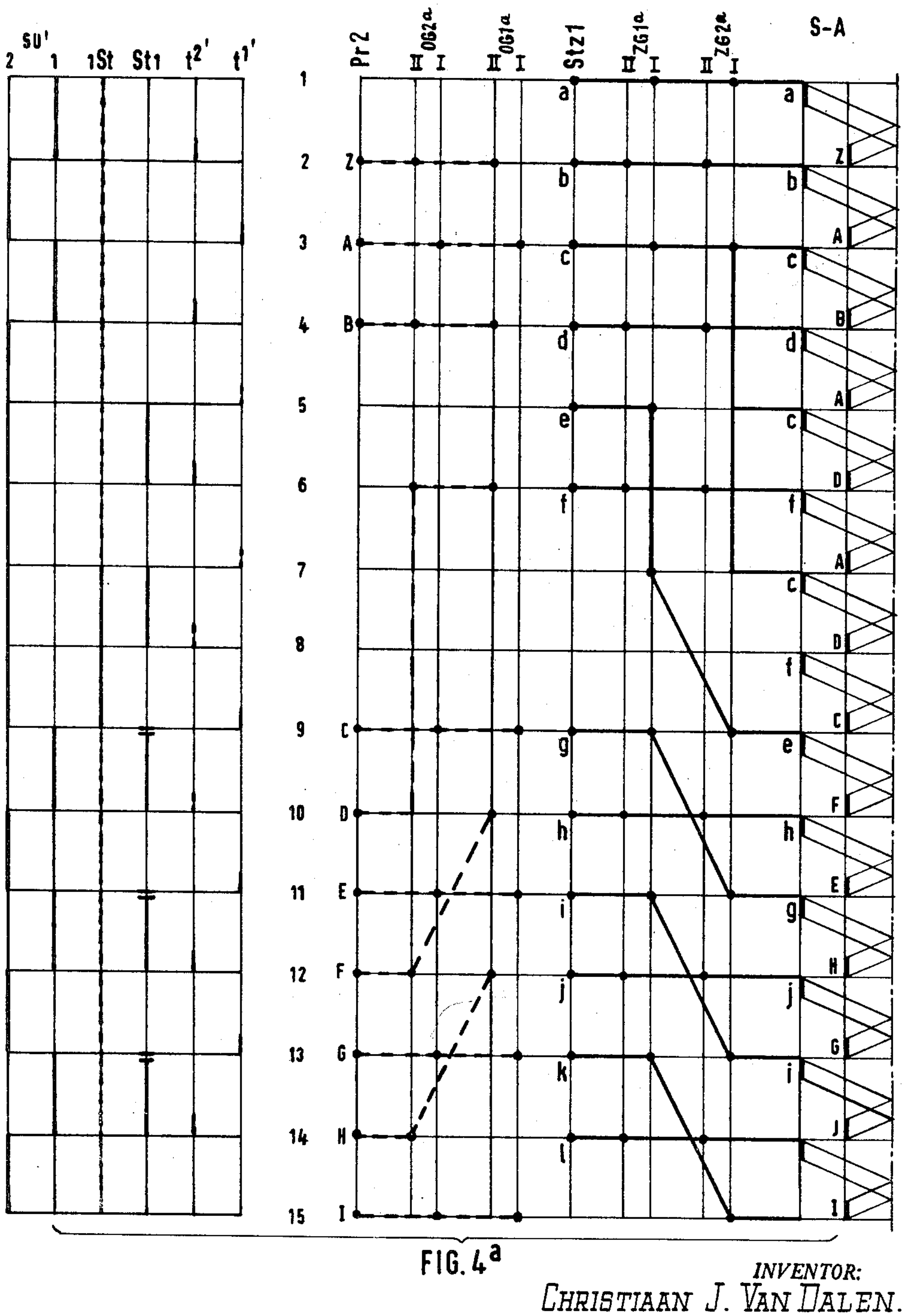
Figure 4B:
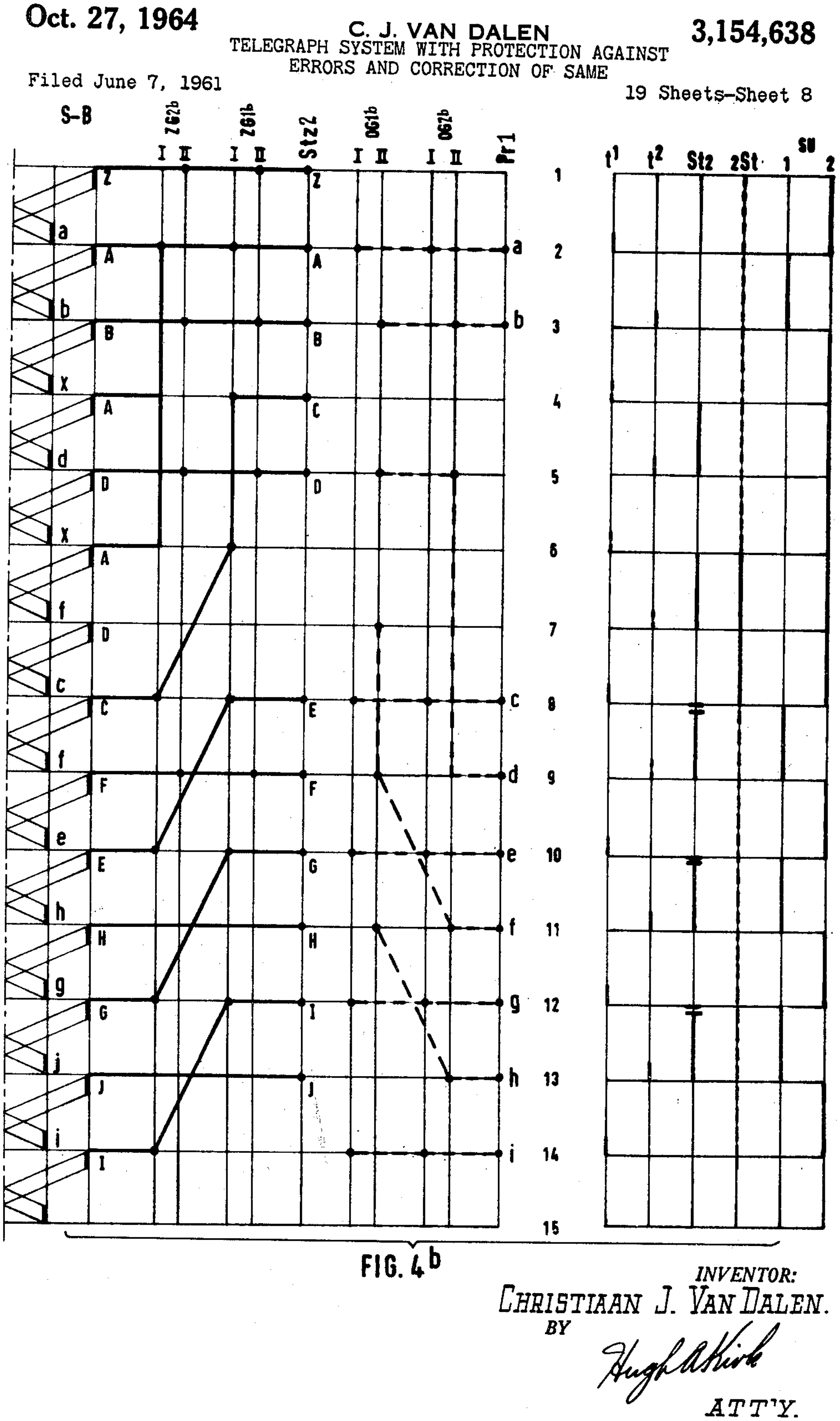
Figure 5A:
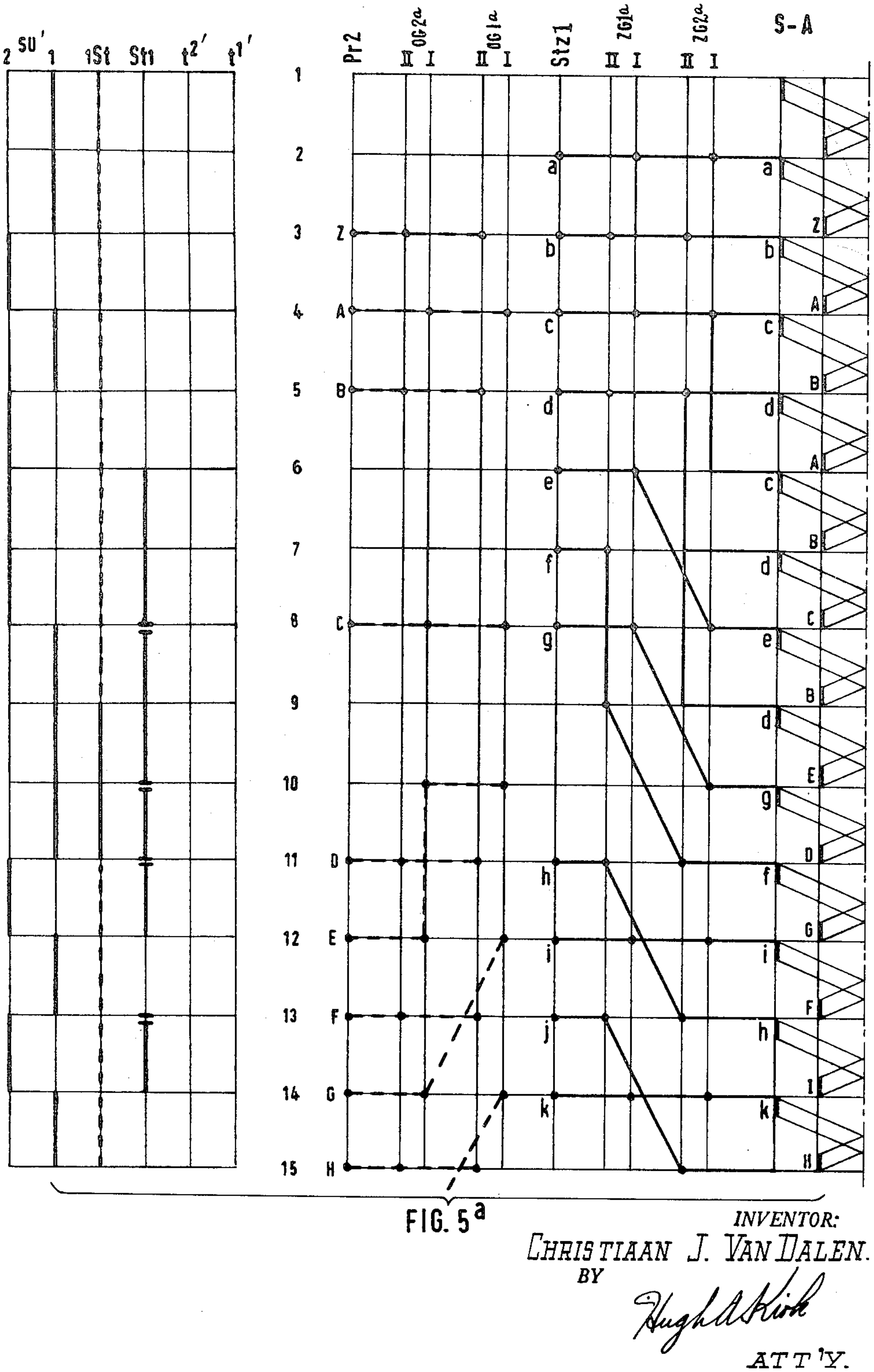
Figure 5B:
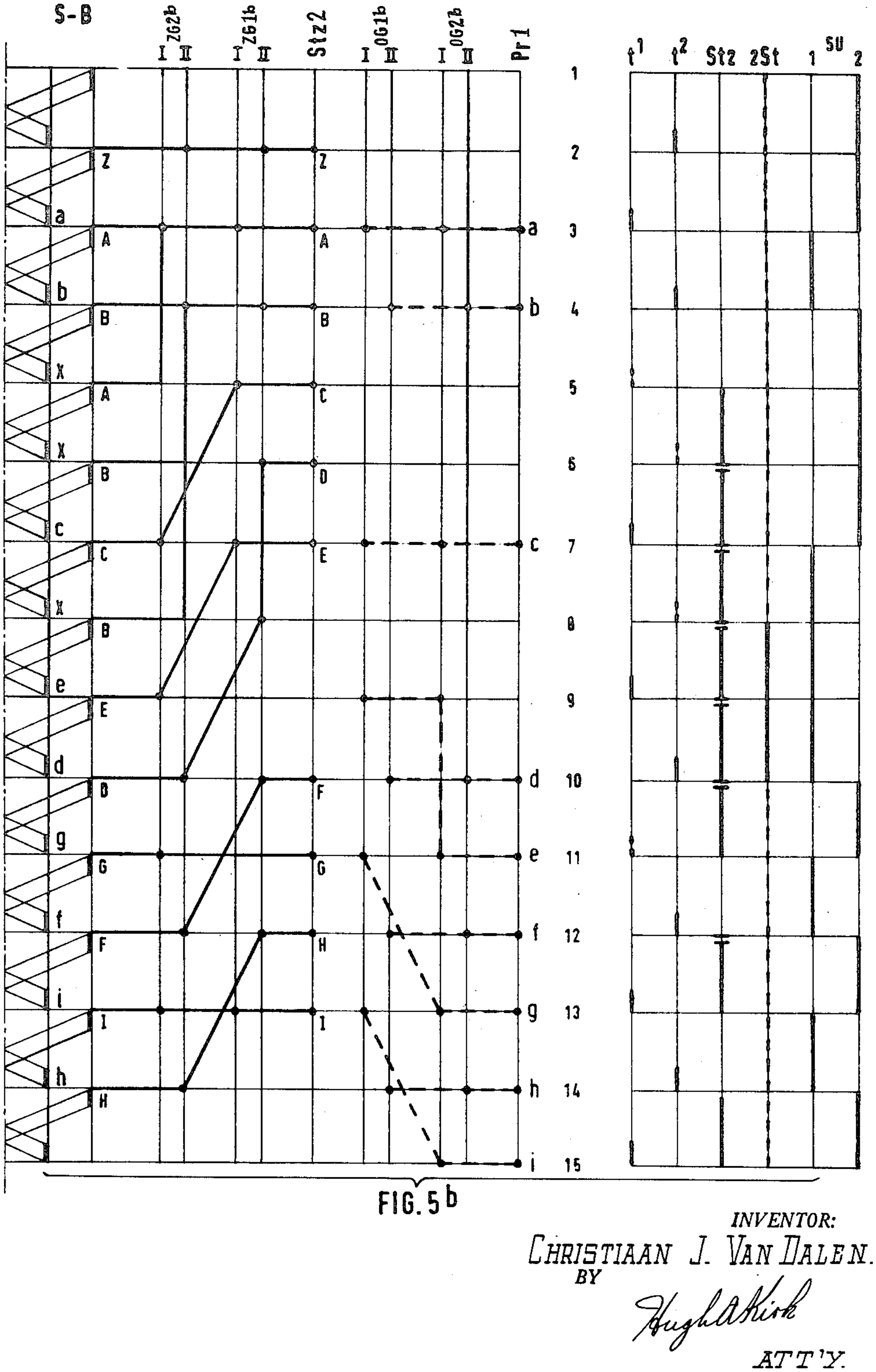

The above mentioned and other features and objects of this invention and the manner of attaining them will become more apparent and the invention itself will be understood best by reference to the following description of an embodiment of this invention taken in conjunction with the accompanying drawings, wherein:

FIG. 1*a* and FIG. 1*b* comprise a time diagram of a two channel communication system according to this invention for an undisturbed response to the mutilation of the letter "*c*";

FIGS. 2*a* and 2*b* comprise a time diagram similar to FIGS. 1*a* and 1*b* for a disturbed response to the mutilation of the letter "*c*";

FIGS. 3*a* and 3*b* comprise a time diagram similar to FIGS. 1*a* and 1*b* for a disturbed response in both channels to mutilation of the letters "*c*" and "*d*";

FIGS. 4*a* and 4*b* comprise time diagrams similar to FIGS. 1*a* and 1*b* for a disturbed response to the mutilation of the letter "*c*" twice in succession in the same channel;

FIGS. 5*a* and 5*b* comprise a time diagram similar to FIGS. 1*a* and 1*b* for a disturbed response in both channels of the letters "*c*" and "*d*" and also to the repetition of the letter "*c*"; and FIGS. 6–2 through 6–10 show similar schematic block wiring diagrams of parts of a circuit at two stations according to the moments 2 through 10 as illustrated in the time diagram of FIGS. 1*a* and 1*b*.

FIGS. 1*a* and 1*b* illustrates a case in which station A transmits an alphabet of small letters, station B transmitting an alphabet of capital letters, both in a two-channel system, for example, to begin with "A" and "*a*," resp., in channel I, then "B" and "*b*," resp., in channel II, etc.

A two-channel system means one in which two channels are used alternately, these channels being provided with common fault signalling apparatus, which prevents a faulty received signal from being passed on only during the reception in the relevant channel, in which that faulty signal was received. In the relevant case fault signalling is done according to the double signalling principle, i.e. by repeating a signal already transmitted, so in the case of the faulty letter "*c*" by repeating the "A," which had already been transmitted in channel I. The blocking of channel I (at "B") as well as the command for the signalling lasts only one rotation.

The progress of the exchange in the case of a mutilation, or in the case of a disturbance of the signalling resulting from this mutilation exhibits the same pattern, as can be seen from the comparative FIGS. 1*a*–1*b* and 2*a*–2*b*, from which FIGS. 1*a* and 1*b* illustrate the undisturbed response to the mutilation of the "*c*," and FIGS. 2*a* and 2*b* show the disturbed response to it.

First of all it will be explained in connection with the time diagrams how the doubling of the memories at both ends influences the storage, and of the arrangement of the signals transmitted correctly but too soon.

The time diagrams relate to a two-channel system, but the invention is not restricted to the use of two channels. However in this particular connection one repetition device is provided which is seized first by one channel and then by the other each rotation.

In the diagrams, time proceeds from top to bottom. It is assumed that the two stations, A and B, transmit alphabets.

In the relevant system, errors are signalled by the principle described in the above mentioned U.S. Patent No. 3,001,018. Thus after the reception of the disturbed "*c*," and "A" already transmitted before is repeated on the return path, from which station A infers that its letter "*c*" has not been received correctly, so that it must be repeated.

In the two-channel system letters are transmitted alternately in two channels having a repetition device in common.

In FIGS. 1*a* through 4*b* the propagation time is assumed to be the maximum possible in this system, viz. ½ signal (in this case 70 ms.).

It can be seen from FIGS. 1*a* and 1*b* that with a simple error, the transmission of letters by the keyers at both ends of the circuit is carried on undisturbedly. At the receiving ends the printing is interrupted for the duration of two rotations. At both ends of the circuit both transmitting memories as well as both receiving memories of the disturbed channels are in use.

It can be seen from FIGS. 2*a* and 2*b* that the course of the transmission is identical to that in FIGS. 1*a* and 1*b*, even if the return signal (A) itself is mutilated.

It can be seen from FIGS. 3*a* and 3*b* that if an error occurs in both channels the result is similar to that of FIGS. 1*a* and 1*b*, i.e. no impression in only two rotations. Now, however, both memories of both channels are in use. As soon as the transmission of signals is stopped for a moment, if there is nothing to be transmitted or if in typewriting the pace can't be kept up (lines 10 and 11), the transmitting and receiving memories are emptied again. It goes without saying that the errors in the two channels need not occur one immediately after the other, as is the case in FIGS. 2*a* and 2*b*.

It can be seen from FIGS. 4*a* and 4*b* that if the same channel is disturbed twice in succession the printing is stopped for four rotations.

FIGS. 5*a* and 5*b* show that the other channel may also be disturbed without further trouble occuring.

In all cases, however, the memories are emptied when no signals are offered by the keyers, so in the case of a simple error on one channel no correct signal is lost. This also will be the case if the same channel is disturbed twice in succession, though in such a case there is still the advantage that only one of the two signals received by the undisturbed channel in that disturbed interval actually needs to be correct (letter "*f*," lines 7 and 9 in FIGS. 3*a* and 3*b*).

When no signals are being transmitted, all the memories return to the initial state.

The property of symmetry of the system finds expression, for instance, in the fact that the course of things in the case of an error is the same, irrespective of whether the subsequent request for repetition arrives correct or not. The only difference is that in the latter case the lines in the diagram are shifted to a later interval.

FIGS. 6–2 to 6–10 show which letters are present in the various parts of the equipment of the two stations at the moments 2 to 10, respectively, indicated in FIGS. 1*a* and 1*b*. To this end the relevant letters are inscribed in the rectangles indicating the various parts of the transmitting station S–A and the receiving station S–B provided with information by it. The return path from B to A, so from the S–B transmitter to the S–A receiver is also shown on each sheet.

Figures 5, 6:
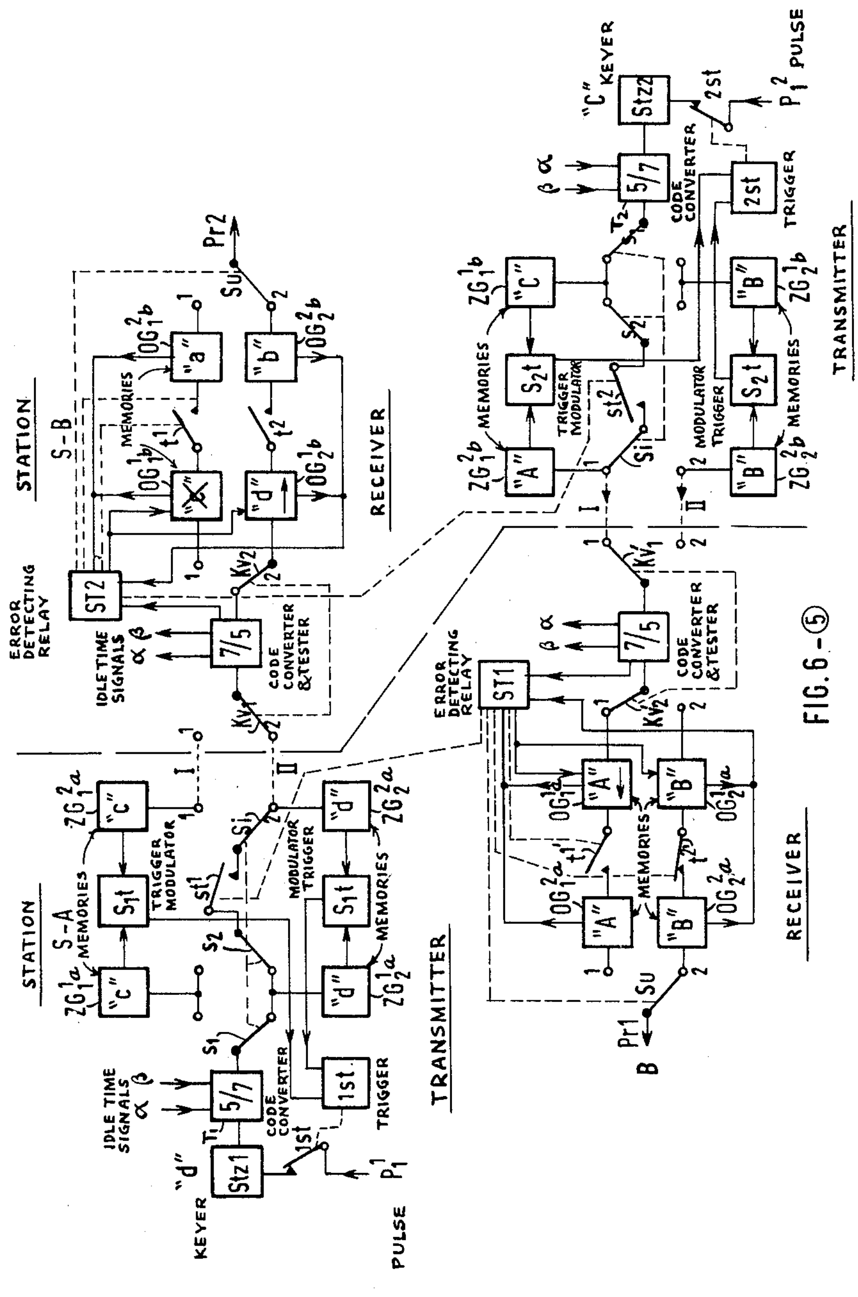
Figure 6:
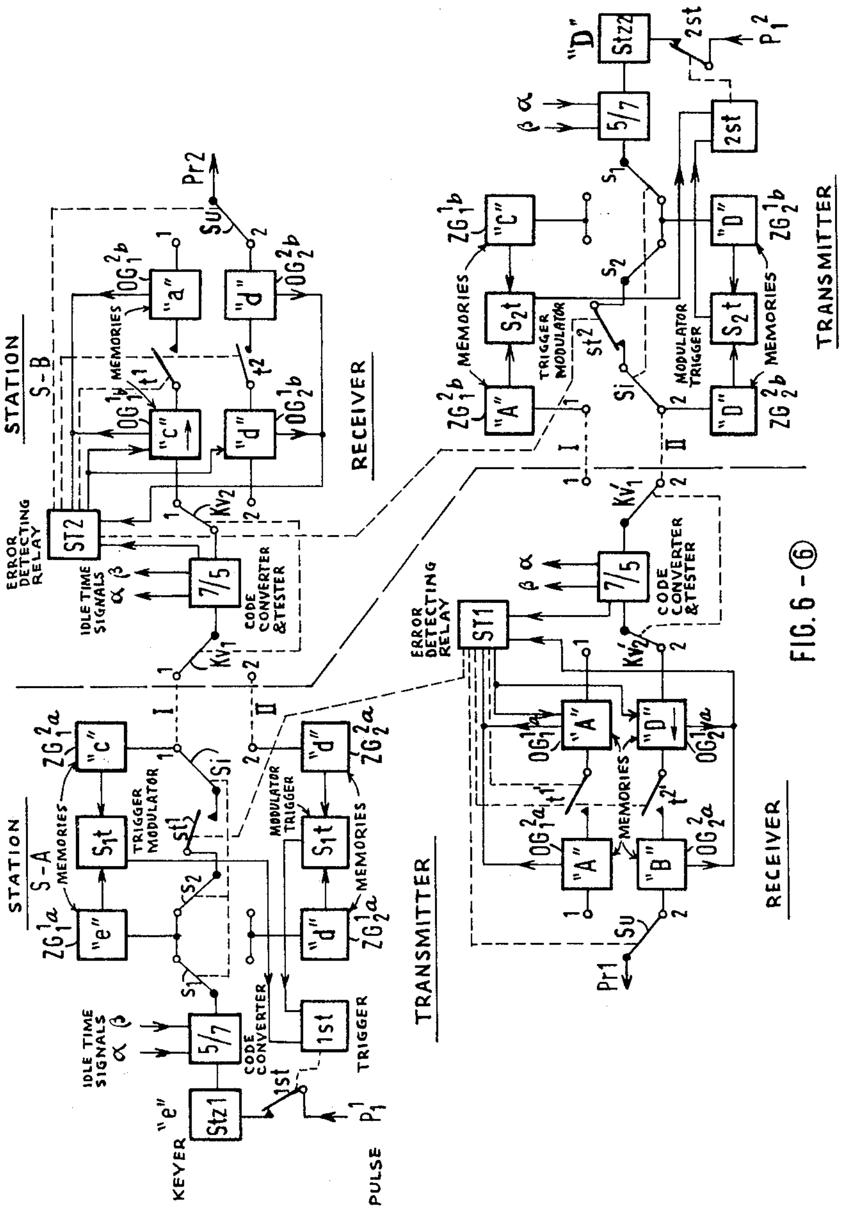
Figures 6, 7:
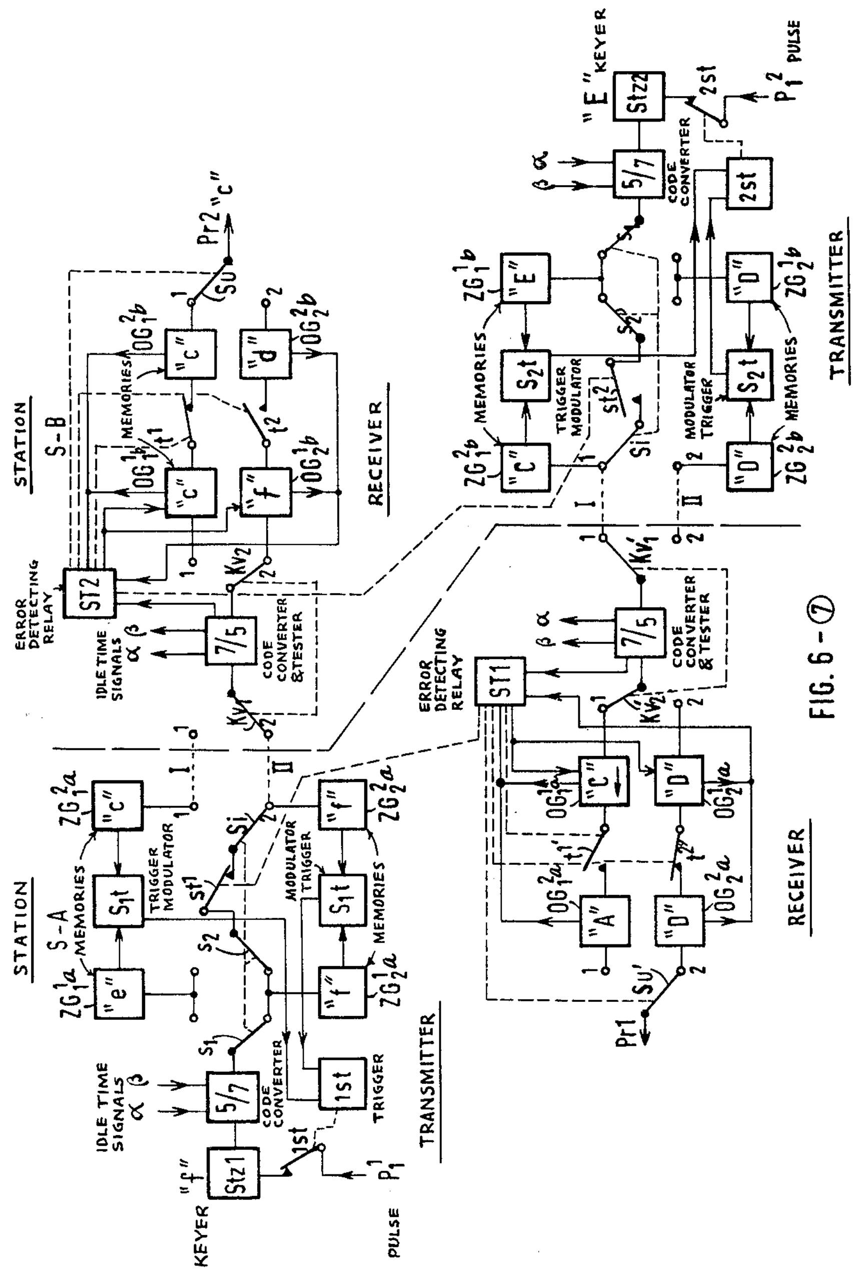
Figures 6, 7, 8, 9:
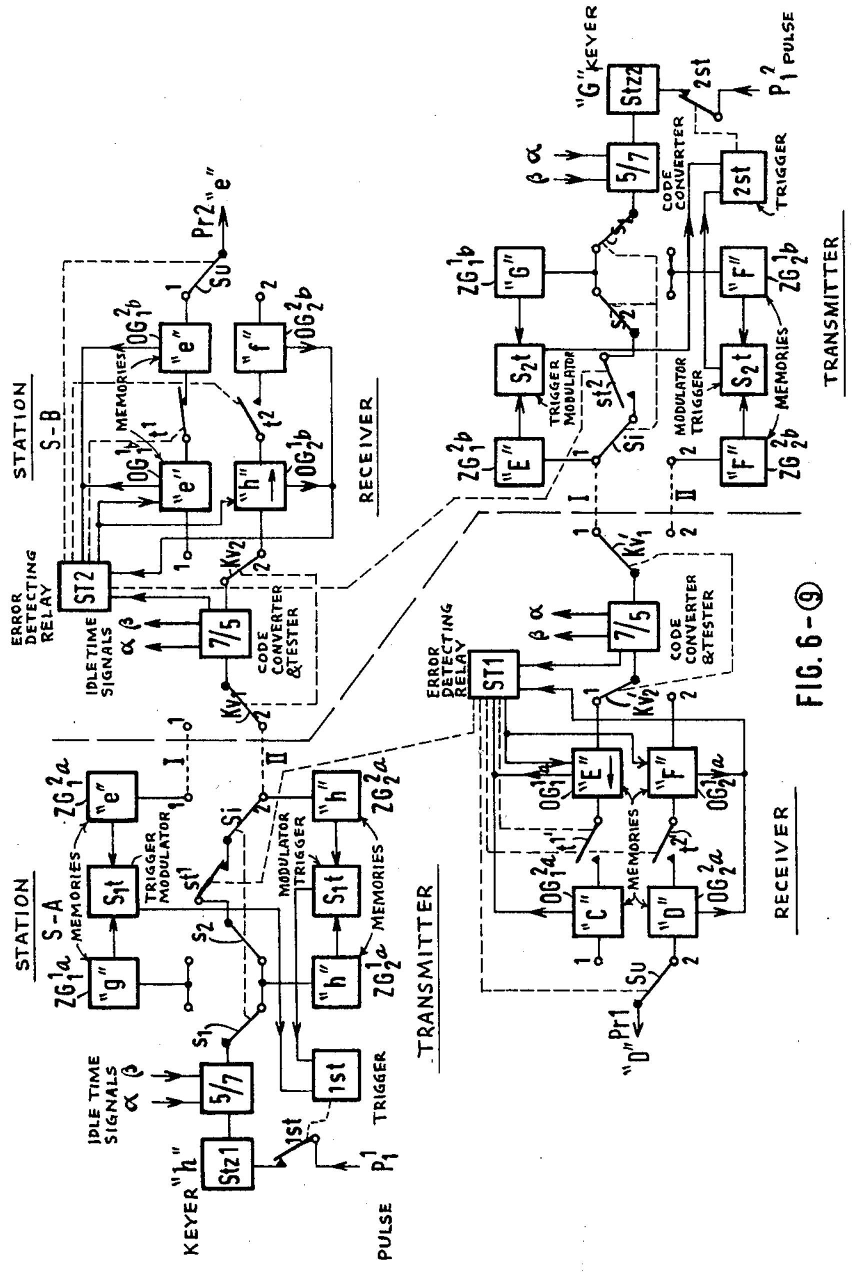
Figures 6, 7, 8, 9, 10:
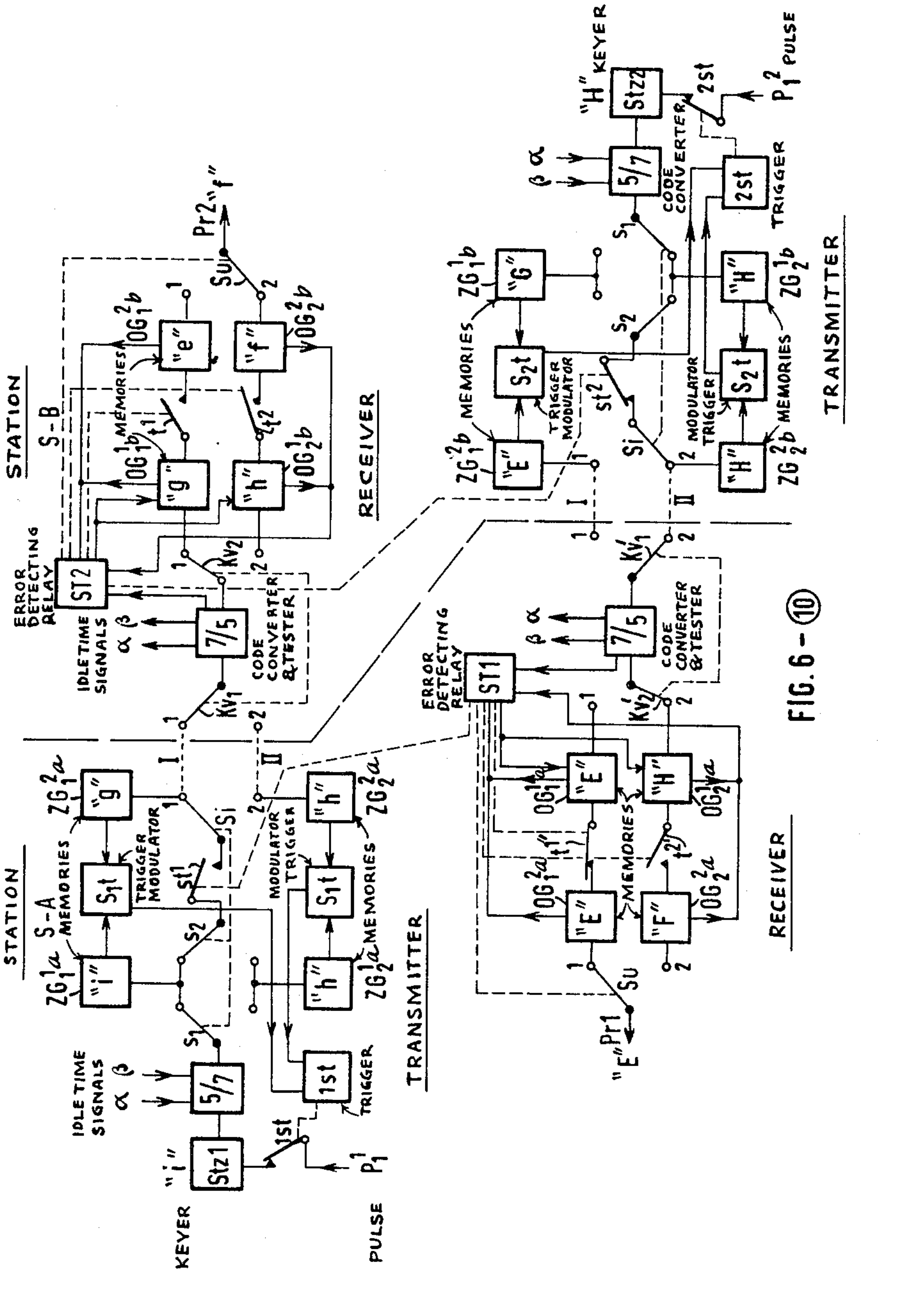

For the sake of clearness either way, A–B and B–A, are shown as divided into two channels I and II, indicated by dotted lines. The high-frequency waves in all these channels, however, go through the same space between stations A and B. In the direction A–B another carrier frequency is used than in the direction B–A, but in FIGS. 6–2 through 6–10 no high-frequency equipment is shown at all. It may be of the usual type. Each of the FIGURES 6–2 through 6–10 shows at the left in the upper half a keyer S*tz*1 controlled by pulses $p_1'$ supplied via a break contact 1*st*. The keyer delivers 5-units signals to the converter T'5/7 to which commands for passing idle time signals $\alpha$ and $\beta$ may also be supplied. In the positions shown of switches S1, S2 and S*i*, the 7-units signals are led through the memories of station S–A shown at the top of the figure (memories $ZG^1{}_1a$ and $ZG^2{}_1a$ of channel I). In FIG. 6–2 it is assumed according to FIG. 1*a*, line 2, that the keyer S*tz*1 has received a pulse from $p_1'$, due to which it delivers the letter "*a*." This letter first reaches the memory $ZG^1{}_1a$ (the letter "*a*" is shown inscribed in the rectangle), and as contact *st'* is at normal, it also reaches, via switch S*i*, the second memory $ZG^2{}_1a$, from which it is passed via a modulator $S_1t$ to the first channel I.

At the receiving end this "*a*" arrives via switch $Kv_1$ at the code converter R'7/5 designed to deliver 5-units signals to the receiving apparatus and also to deliver the idle time signals $\alpha$ and $\beta$ that may occur. Further in this code converter R'7/5 the received signal is tested as regards the ratio of the numbers of spacing and marking elements.

In the case of an incorrect ratio the error detecting relay $ST_2$ is energized via the connection indicated. Via switch $Kv_2$ the letter "*a*" arrives at the first of the two upper memories ($OG^1{}_1b$) of station S–B. A letter "*a*" is inscribed again in the relevant rectangle, but the accompanying arrow indicates that the letter only arrives after the propogation.

In the direction B–A the keyer $Stz^2$ transmits the letter "Z" at moment 2, as contact 2*st* is still closed, so that the command pulse $p^2{}_1$ can pass. The letter "Z" is thus passed to the code converter $T^25/7$, to the memory $ZG^1{}_2b$ in in FIG. 6–2 and from there via switch S2', back contact $st^2$ and switch S*i'* to the memory $ZG^2{}_2b$ as indicated. From this memory $ZG^2{}_2b$ the letter "Z" goes via the radio path, notably the lower dotted line connection shown, called channel II in this case, to the receiver, where it is applied via switch $KV'_1$, to the code converter $R^27/5$ and thence as a 5-units signal via switch $Kv_2'$, contact 2, to the memory $OG^1{}_2a$. The arrow shown under the symbol "Z" indicates again that this symbol or letter "Z" arrives only towards moment 3 in FIGS. 1*a* and 1*b*.

FIG. 6–3 shows what happens further with the letter

"$a$" after its complete arrival at the memory $OG^1{}_1b$ in the receiver of station S–B.

During the steps of FIGS. 1$a$ and 1$b$ the break contacts 1$st$ and 2$st$ remain at normal. During other operations (e.g. according to FIGS. 3$a$ and 3$b$) they serve to stop the keyers temporarily, if both transmitting memories are full (as at steps 10 and 11 in FIGS. 3$a$ and 3$b$).

In such case a trigger S1T, or S2T, respectively operates and controls a trigger 1$ST$ (in Station A) or 2$ST$ (in Station B), respectively. Either of these triggers controls its simple break contact 1$st$ and 2$st$ respectively to step the keyer $Stz1$ and $Stz2$ further. The switches S1′, S2, S2′, $Si$, $Si'$, $Kv_1$, $Kv_1'$, $Kv_2$ and $Kv_2'$ are changed over synchronously to ensure the alternate transmission of the signals in channels I and II. Thus it appears from FIGS. 1$a$ and 1$b$ that about moment 2 the letter "$a$" is marked by dots in the channel I-memories of the transmitting memories $ZG^1{}_1a$ and $ZG^2{}_1a$, respectively. For the other places in the figures it can also easily be deduced from the places of the dots, which memories are used for reception and transmission.

Contacts $t^1$ and $t^2$ are changed over accordingly as is required for the transfer of letters from a memory $OG^1{}_1a$ or $OG^2{}_1b$, so they are also under the control of the repetition device, which is exclusively formed by the error detecting relay ST2 for the direction A–B, and relay ST1 for the direction B–A, in such a way e.g. that ST2 periodically closes contacts $t^1$ and $t^2$ respectively for a short time, as is necessary for the transfer of a signal correctly received in $OG^1{}_1b$. Contacts $st^1$ and $st^2$ are controlled by the respective error detecting relays ST1 and ST2 to break the connection between the groups of transmitting memories $ZG^1{}_1a$ and $ZG^1{}_2b$. Switch $Su$ and $Su'$ carries out commutations as required for leading the letters from the memories $OG^2{}_1b$, $OG^2{}_2b$, and $OG^2{}_1a$, $OG^2{}_2a$ to the respective printers $Pr2$ and $Pr1$, as will be seen further.

The block diagram is identical for all the FIGURES 6–2 to 6–10, except for the positions of the various contacts and the contents of the various memories, a blank rectangle represents an empty memory.

At moment 3 (FIG. 6–3) the keyer scans the letter "$b$" and passes it to the memories $ZG^1{}_2a$, $ZG^2{}_2a$ of channel II at station S–A. Via channel II this letter "$b$" reaches memory II of the $OG^1{}_2b$ memory group, after the propagation time has expired, as indicated by the arrow under the "$b$" in memory II of column $OG_2b$ in FIG. 1$b$. At the same time the "$a$" entirely stored in memory $OG^1{}_1b$, channel I by now, is transferred via contact $t^1$ to memory $OG^1{}_1b$, channel I and from there via switch SU in position 1 to printer $Pr2$.

At moment 3 too, keyer Stz2 scans the letter "A" and passes it to the memories of channel I in the transmitter of station S–B. Also at moment 3 the letter "Z," which was scanned by the keyer and stored in the memories of channel II in position 2, remain in the memories $ZG^1{}_2b$ and $ZG^2{}_2b$ of channel II until they are overwritten by the next letter of this channel, being the letter "B" (FIG. 6–4). The letter "Z" had already been announced via channel II in receiving memory $OG^1{}_2a$, channel II, in FIG. 6–2. In FIG. 6–3 it is completely stored, at moment 3, to be transferred immediately to receiving memory $OG^2{}_2a$, channel II, because contact $t^2$ is short-circuited by relay ST1 at normal. From memory $OG^2{}_2a$, channel II, the letter "Z" is immediately fed to the printer $Pr1$.

At moment 4, FIG. 6–4, keyer $Stz1$ scans the "$c$." This letter is led again to the memories $ZG^1{}_1a$ and $ZG^2{}_1a$ of channel I. As a rule the even signals are transmitted in channel II and the odd signals in channel I. This letter "$c$" starts arriving at the receiver in the first memory of channel I, $OG^1{}_1b$. At the same time the letter "$b$," arriving from channel II, is printed. In the direction B–A the letter "B" is scanned and the letter "A" is printed.

At moment 5 in FIG. 6–5 the letter "$c$" would have been received completely in receiving memory $OG^1{}_1b$ of channel I, but it was disturbed during the transmission, so that the error detecting relay ST2 has operated thereby changing over its contact $st^2$ and leaving contact $t^1$ open, due to which the contents of memory $OG^1{}_1b$ are not transferred to memory $OG^2{}_1b$. This transfer then will only occur at moment 7 (FIG. 6–7), after the letter "$c$" has been repeated and received correctly at memory $OG^1{}_1b$, where the incorrect letter "$c$" is overwritten.

In the direction B–A the letter "B" is printed at moment 5. At the transmitting end the letter "C" is scanned at that moment and stored in transmitting memory $ZG^1{}_1b$ of channel I. Contact $st^2$ being opened, however, this letter is not transferred to transmitting memory $ZG^2{}_1b$, channel I. So at this moment the letter "A" is transmitted again. At the receiver S–A it is first received in memory $OG^1{}_1a$, channel I. When it is compared with the contents of memory $OG^2{}_1a$, channel I in the error detecting relay ST1 via the connections shown, it appears that the letter "A" had already been received before; that is why relay ST1 operates and opens its contact $st^1$, the letter "$c$" in $ZG^2{}_1a$, channel I is not overwritten by the "$c$" stored in memory $ZG^1{}_1a$ and the "$c$" is transmitted again in channel I at the next transmission from this channel I.

At moment 6 (FIG. 6–6) the corrected letter "$c$" starts to be stored in the receiving memory $OG^1{}_1b$ of channel I. At the same time the letter "$d$" received via channel II is stored in memories $OG^1{}_2b$ and $OG^2{}_2b$. At station A no printing occurs, because at this step the letter "A" has arrived again, indicating that the letter "$c$" to be repeated. So the two receiving memories of channel I of station A contain the same letters as they had at moment 5 just previously; under this circumstance the repetition device has caused relay $St1$ to operate, due to which contact $t^{1\prime}$ has not been closed, as occurs periodically at other times to pass the letter from memory $OG^1{}_1a$ to memory $OG^1{}_2a$.

The transmission of the further letters "C" to "E" and "$d$" to "$f$", respectively, during steps 7 to 10 can be easily traced from the further sketches of FIG. 6.

The switching times of the contacts $t^1$, SU, $SU^1$, $t^2$, and $t^{2\prime}$, which are also controlled by the error detecting relays ST1 and ST2 are indicated in FIGS. 1$a$ through 5$b$.

While I have illustrated and described what I regard to be the preferred embodiment of my invention, nevertheless it will be understood that such is merely exemplary and that numerous modifications and rearrangements may be made therein without departing from the essence of the invention, I claim, 1. A type of printing telegraph system for two-way radio traffic operative between two stations, comprising:
 (A) means connected to each message receiving station for detecting mutilated signals,
 (B) automatic means connected to each station for repeating the signal which was detected as being mutilated,
 (C) two successive storage means for the same signal connected to each message transmitting and to each message receiving station for retaining signals transmitted and received between transmission and retransmission and reception and repetition, respectively, of said mutilated signal, and
 (D) means connected to each said storage means for selecting the signals stored in each receiving station in the order they would be received from the transmitter if no mutilation occurred.

2. A system according to claim 1 comprising: at least two separate channels of radio transmission for sending the message including
 (1) means connected to each message sending station for sending successive signals of said message on alternate channels, and
 (2) means connected to each message receiving station for associating each signal with the channel in which it was transmitted.

3. A system according to claim 2 wherein said automatic repeating means includes means connected to said detecting means for repeating the last signal transmitted from that station over the same channel as the mutilation was detected for requesting the repetition of the signal received mutilated.

4. A system according to claim 2 wherein said means for detecting mutilated signals includes means for preventing shifting said signals from the first to the second of said two successive storage means in each channel at each transmitting and receiving station.

5. A system according to claim 2 wherein said automatic repetition means includes means for comparing each signal received to that of the previous signal received, and when it is the same to request repetition of the previously received signal in that channel.

6. A system according to claim 2 wherein said means for detecting mutilated signals connected to each message receiving station is common for both said channels.

7. A system according to claim 1 wherein said means for selecting signals in the proper order includes means for preventing the shifting of a stored signal from the first to the second of said two successive storage means until it has been proven to be unmutilated or not identical to a signal already stored in said second storage means.

8. A system according to claim 1 wherein each station includes
(1) a keyer, and
(2) means to stop said keyer when both said transmission storing means for a channel are filled.

9. A system according to claim 1 wherein each station includes a printer controlled by said selecting means.

10. A system according to claim 1 wherein each transmitter and receiver at each station includes a code converter for converting a multi-element signal into a constant radio signal before its transmission, and for reconverting at each receiver said constant ratio signal back into the original multi-element signal.

11. A system according to claim 10 wherein said means for detecting mutilation is connected to said code-converter at each receiver.

12. A system for communicating a plurality of successive signals between two stations in both directions, each station comprising:
(A) a transmitter comprising:
(1) two means for successively storing each signal to be transmitted,
(2) means connected to the first said transmitter storing means to feed said signals thereto,
(3) means connected to both said transmitter storing means to transfer said signals from said first transmitter storing means to the second said transmitter storing means, and
(4) means connected to said second transmitter storing means for successively transmitting said signals therefrom, and
(B) a receiver comprising:
(1) two means for successively storing each signal received from said transmitter,
(2) means connected to the first said receiver storing means, for receiving said signals,
(3) means connected to said signal receiving means and to said receiver storing means, for detecting errors and duplication of the signals received,
(4) means connected between said receiver storing means, for transferring signals from said first receiver storing means to the second said receiver storing means,
(5) means connected to said second receiver storing means, for removing signals therefrom, and
(6) means connected between said detecting means and said transferring means in both said transmitter and said receiver at that station, for controlling their operation;

whereby erroneously received signals are not stored and a request for their repetition is made by preventing the transfer of the signal stored in said first storing means to said second storing means so that the signal stored in said second storing means will be transmitted again; and
whereby the signals removed by said removing means in said receiver are in the same sequential order as the signals fed to said feeding means in said transmitter.

13. A system according to claim 12 comprising two separate channels of communication between each transmitter and receiver for one message of a plurality of signals, wherein each said transmitter and said receiver comprises:
(1) two of said successive storing means arranged in parallel, and
(2) synchronized switching means at both stations for connecting successive signals fed to each transmitter and received by each receiver, to alternate ones of said parallel arranged storing means.

14. A system according to claim 13 wherein each transmitter includes:
(1) means connected to all four of said transmitter storing means for comparing the signals stored therein, and
(2) means connected to said comparing means for controlling the operation of said feeding means for preventing the feeding of additional signals to said storing means when each of said four storing means is storing a different signal.

15. A system according to claim 12 wherein said feeding means in said transmitter comprises a keyer.

16. A system according to claim 12 wherein each said removing means in said receiver comprises a printer.

17. A system according to claim 18 wherein said feeding means in each transmitter comprises a code converter for converting a multi-element signal into a constant-ratio signal, and wherein said receiving means in each receiver comprises a re-converting means for converting the constant-ratio signal back into the original multi-element signal.

18. A system according to claim 17 wherein said code converter includes idle-time signal generating means and said re-converting means includes idle-time signal detecting means.

19. A system for communicating a plurality of successive signals between two stations in both directions, each station comprising:
(A) a transmitter comprising:
(1) a source of signals to be transmitted,
(2) a first pair of transmitter storing means for alternately storing said signals to be transmitted, the odd numbered signals in the sequence of the signals to be transmitted being stored in one storing means, and the even numbered signals being stored in the other storing means,
(3) means alternately connecting at a constant rhythm said first pair of transmitter storing means to said source,
(4) a second pair of transmitter storing means for storing the signals to be transmitted, respectively connected with said first pair of transmitter storing means,
(5) means to transfer said signals from said first transmitter storing means to said second transmitter storing means,
(6) means connected to said first and second transmitter storing means to control said transfer means, and
(7) means connected to said second transmitter storing means for alternately transmitting said signals therefrom, the odd numbered signals being transmitted via a first channel, the even numbered signals being transmitted via a second channel, whereby the signals are alternately transmitted via said first and second channels; and (B) a receiver comprising:

(1) a signal receiving means (2) a first pair of receiver transmitting means for alternately storing the signals received from said transmitter, the odd numbered signals in the transmission sequence of the signals being stored in one storing means and the even numbered signals being stored in the other storing means, (3) means alternately connecting at a constant rhythm said first pair of receiver storing means to said signal receiving means, (4) means connected to said signal receiving means and to said first pair of receiver storing means for detecting errors and duplication of the signals received and for requesting their repetition, (5) a second pair of receiver storing means for storing the signals received, respectively connected with the said first pair of receiver storing means, (6) means to transfer said signals from said first receiver storing means to said second receiver storing means (7) means for removing the received signals, and (8) means connected to said second receiver storing means to direct the signals to said signal removing means;

whereby the signals are transmitted alternately via said first and second channels without interruption even during repetition cycles and erroneously received signals are prevented from being stored and a request for their repetition is made by the re-transmission of the just previously transmitted signal via its corresponding channel by preventing the transfer of the signal stored in said first transmitter storing means to said second transmitter storing means;

whereby the signals removed by said signal removing means in said receiver are in the same sequential order as the signals taken from said source of signals to be transmitted in said transmitter.

References Cited in the file of this patent

UNITED STATES PATENTS

| | | |
|---|---|---|
| 2,706,215 | Van Duuren | Apr. 12, 1955 |
| 2,903,514 | Van Duuren | Sept. 8, 1959 |
| 2,970,189 | Van Dalen et al. | Jan. 31, 1961 |
| 2,995,626 | Van Duuren | Aug. 8, 1961 |
| 3,001,017 | Dirks | Sept. 19, 1961 |
| 3,001,018 | Van Dalen | Sept. 19, 1961 |